June 28, 1966    J. C. MEYER    3,258,299
SLIDING SUPPORT WITH ADJUSTABLE SHOCK BLOCK
Filed Oct. 21, 1963
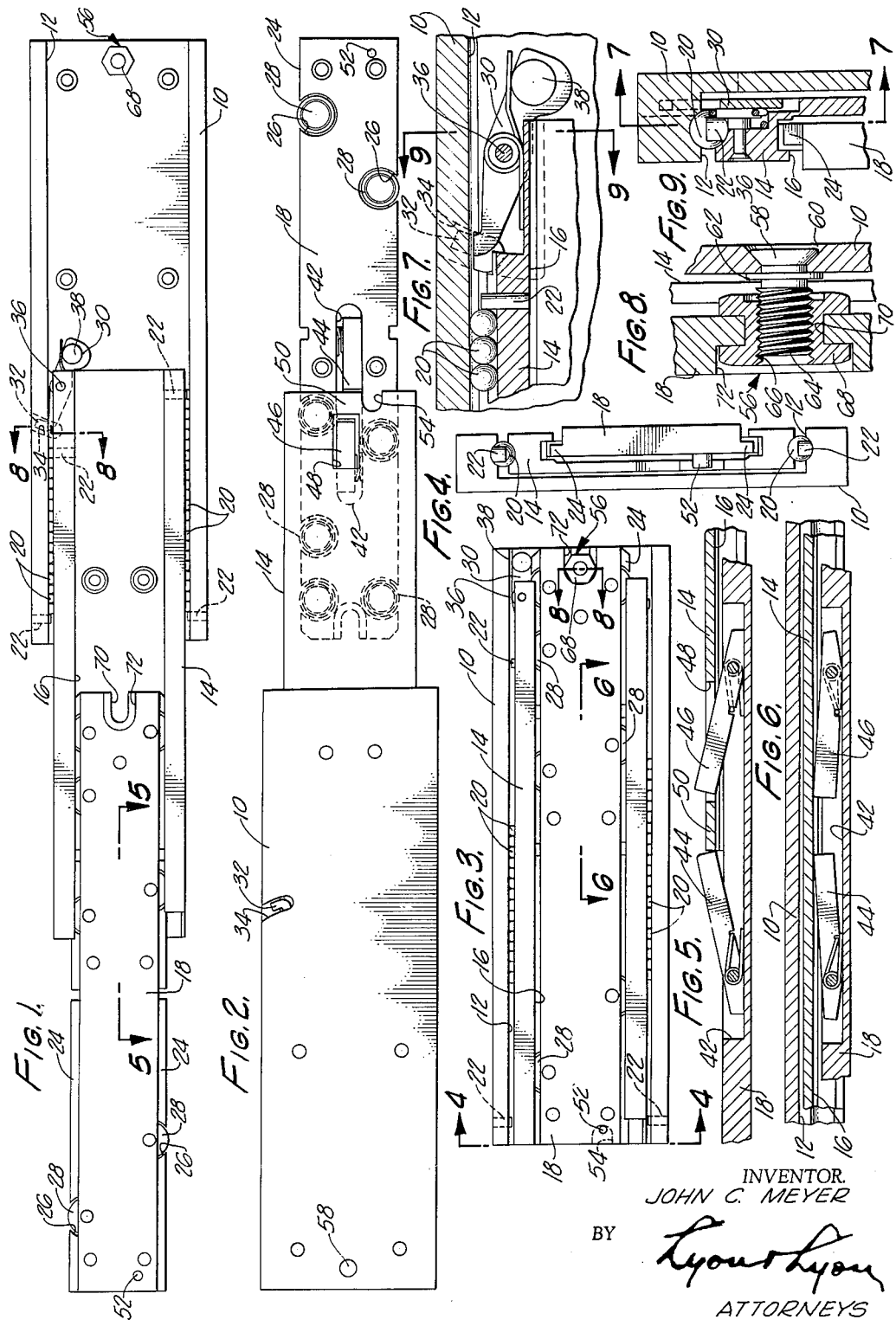
INVENTOR.
JOHN C. MEYER
BY
*Lyon & Lyon*
ATTORNEYS

United States Patent Office 3,258,299
Patented June 28, 1966

3,258,299
SLIDING SUPPORT WITH ADJUSTABLE SHOCK BLOCK
John C. Meyer, Fullerton, Calif., assignor to Jonathan Manufacturing Company, Fullerton, Calif., a corporation of California
Filed Oct. 21, 1963, Ser. No. 317,518
7 Claims. (Cl. 308—3.8)

This invention relates to sliding supports having a plurality of telescoping slide members and more particularly relates to such a sliding support having an improved shock block for limiting the vibration of the support.

In both military and commercial applications, various electronic components and systems are mounted within a cabinet on slides or drawers so that they can be easily withdrawn for operation, inspection or repair. Such sliding supports commonly have three telescoping members which are provided with suitable sliding bearings therebetween. The largest or outer member is fixedly mounted on the cabinet or housing while the inner and smallest member supports the electronic assembly. These cabinets are subjected to vibration and shock from many sources, for example, they are often mounted in vehicles, or transported by them, and are also subjected to vibrations set up by the electronic apparatus itself. This shock and vibration is frequently amplified by the structure itself with resultant damage to the electronic apparatus.

As a result of this vibration problem, such sliding supports in the past have been provided with means for locking the three slide members against relative movement when they are in the closed position. Such devices have, however, heretofore not been easily adaptable to meet varying conditions, for example, varying tolerances between chassis and cabinet structure.

It is therefore an object of the present invention to provide a sliding support having an adjustable shock block for reducing amplification of shock or vibration.

These and other objects and advantages of the present invention will become more apparent upon reference to the accompanying description and drawings in which:

FIGURE 1 is a top plan view of the sliding support of the present invention;
FIGURE 2 is a bottom plan view of the sliding support of the present invention;
FIGURE 3 is a top plan view of the sliding support of the present invention showing the support in a closed position;
FIGURE 4 is a view taken along lines 4—4 of FIGURE 3;
FIGURE 5 is a view, partly in section, taken along lines 5—5 of FIGURE 1;
FIGURE 6 is a view, partly in section, taken along lines 6—6 of FIGURE 3;
FIGURE 7 is a view, partly in section, taken along lines 7—7 of FIGURE 9;
FIGURE 8 is a sectional detail taken along lines 8—8 of FIGURE 3; and
FIGURE 9 is a view, partly in section, taken along lines 9—9 of FIGURE 7.

Referring now to the several figures, there is shown a sliding support whose outer or stationary member 10 is rigidly fixed by screws or the like to the inside of a suitable cabinet. There is a slide mechanism on each side of the cabinet for each electronic assembly; however, since one is a mirror image of the other, only one is illustrated and described.

The member 10 has a slot or channel 12 extending the length thereof which slidably receives the remainder of the support. An intermediate sliding member 14 is slidably mounted in the channel 12 and is itself provided with a longitudinal channel 16 extending its entire length. The third sliding member 18 is mounted in this channel and is rigidly secured by screws or the like to the base of the electronic assembly being supported. The opposed flanges of member 10 forming channel 12 and the upper and lower surfaces of intermediate member 14 are grooved to form a race for ball bearings 20. Pins 22 in channel 12 prevent escape of the balls.

The third sliding member 18 is provided with flanges 24 having cutouts 26 in which are located antifriction rollers 28. The opposed flanges of the intermediate member 14 forming the channel 16 are provided with grooves for receiving the flanges 24 and rollers 28. The intermediate member 14 carries a spring loaded catch 30 having a protuberance 32 thereon which projects into a suitable hole 34 in the member 10 when the intermediate member 14 is fully withdrawn to latch this intermediate member in this position. The catch 30 is pivotally mounted on a pin 36 and is provided with a pin 38 which is engaged by the end of the outer or third member 18 when this member is telescoped all the way into the channel 16, thus causing the protuberance 32 to be withdrawn from the hole 34, freeing the intermediate member 14 for movement in the channel 12.

The member 18 is provided with a recess 42 which houses spring loaded latches 44 and 46. The latch 44 cooperates with the outer end of the intermediate member 14 to prevent the member 18 from being moved back into the channel 16 once it has been fully withdrawn. The latch 46 cooperates with a slot 48 formed in the member 14 to prevent the member 18 from being completely withdrawn from the channel 12. The latch 44 is offset from the slot 48 so that it cannot engage the inner end thereof. It can be seen that when the member 18 is fully extended, the latches 44 and 46 engage both sides of a bridge 50 formed by the slot 48. In order to slide the member 18 back into the channel 16 it is necessary to depress the end of the latch 44. The camming action of the inner end of the slot 48 causes the latch 46 to be forced down into recess 42. In order to prevent the member 18 from sliding too far into the channel 16, this member is provided with a pin 52 which cooperates with a slot 54 formed in the member 14.

A shock block, generally indicated at 56, is mounted on the base of the member 10 adjacent its inner end and intermediate the side flanges thereof. As can best be seen from FIGURE 8, this shock block 56 includes a stud 58 which is inserted through a counter sunk hole 60 in the base of the member 10 and held in place therein by a flange 62 which is formed on stud 58. The upper portion of the stud 58 is provided with helical screw threads which are adapted to cooperate with a self locking threaded insert 64 which in turn cooperates with threads 66 of a double flange helical nut 68. The two flanges of the nut 68 cooperate with a stepped slot 70 formed in the rear end of the member 18. The step or shoulder 72 of the slot 70 receives the upper flange of the nut 68 which the lower level of the slot 70 engages the center portion or post of the nut 68. The flanges of the nut 68 engage the surface of the shoulder 72 and the undersurface of the member 18. The shoulder 72 is provided so that the top of the nut 68 is below or flush with the surface of the member 18 and thus does not interfere with the mounting of equipment thereon.

The shock block 76 cooperates with the slot 70 in the member 18 to prevent the member 18 from moving relative to the member 10 under ordinary shock and vibration conditions. The pin 52 on the member 18 is positioned in the slot 54 in the member 14 and thus this intermediate member 14 is also prevented from moving. The nut 68 can be adjusted to compensate for various tolerance conditions between the cabinet and the slide and can also be adjusted to give greater resistance to amplification of shock or vibration. By screwing the nut 68 further down on the thread 64 of the stud 58, the members 18 and 10 will be more firmly clamped together.

From the foregoing description, it can be seen that a sliding support has been provided which is firmly locked against movement in either its open or closed positions. The support is provided with an adjustable shock block that increases the support's usefulness under varying tolerance conditions. Although the described and illustrated apparatus is the preferred form of my invention, it should be understood that various alterations and modifications may be resorted to without departing from the scope of the invention and such alterations and modifications are intended to be included within the scope of the appended claims.

I claim:

1. A slide mechanism comprising a series of telescoping slide members, the outermost member having an adjustable shock block mounted thereon, the innermost member having a slot formed in its inner end, said shock block engaging a portion of said innermost member adjacent said slot when said slide members are closed, a pair of spring biased latches mounted in a recess in the underside of said innermost member, said latches cooperating with a bridge portion of the next preceding slide member to lock said innermost member against movement in either direction when it is withdrawn a predetermined distance, said bridge portion being formed by at least one slot formed in said preceding slide member.

2. A slide mechanism comprising a series of telescoping slide members, the outermost member having a threaded stud mounted on its outermost end, said stud having a flanged nut threaded thereon, the innermost member having a slot formed in its inner end, said flanged nut engaging the walls of said slot and the surface of said innermost member adjacent said slot when said slide members are closed, a pair of spring biased latches mounted in a recess in the underside of said innermost member, said latches being urged out of said recess to cooperate with a bridge portion of the next preceding slide member to lock said innermost member against movement in either direction relative to said preceding member when it is withdrawn a predetermined distance, said bridge portion being formed by at least one slot formed in said preceding slide member.

3. A slide mechanism comprising a series of telescoping slide members, the outermost member having a threaded stud mounted on its outermost end, said stud having a nut threaded thereon, said nut having upper and lower horizontal flanges and a vertical post intermediate said flanges, the innermost member having a slot formed in its inner end, said post of said nut engaging the walls of said slot and said upper and lower flanges engaging the horizontal surfaces of said innermost member adjacent said slot when said slide members are closed to prevent vibration of said slide members.

4. The apparatus of claim 3 wherein said slot is provided with a shoulder which is engaged by said upper flange of said nut whereby the upper surface of said nut is positioned below the surface of said innermost member.

5. A slide mechanism comprising a first member having a channel therein, a second member having a channel therein, said second member being slidably mounted in the channel of said first member, and a third member slidably mounted in the channel of said second member, said first member having an adjustable shock block mounted thereon adjacent its inner end, said third member having a slot formed in its inner end, said shock block engaging a portion of said third member adjacent said slot when said members are closed, a pair of spring biased latches mounted in a recess in the undersurface of said third member, a slot formed in said second member adjacent the end thereof, said latches being urged out of said recess to cooperate with said slot and said end to lock said third member against movement in either direction relative to said second member when said third member is withdrawn a predetermined distance, and means mounted on said second member for cooperating with an opening in said first member for preventing relative movement of said first and second members when said second member is withdrawn a predetermined distance, said means being engageable by said third member to release said first and second members.

6. The apparatus of claim 5 wherein said latches are offset in said recess so that one of said latches is unable to enter said slot.

7. A slide mechanism comprising a first member having a channel therein, a second member having a channel therein, said second member being slidably mounted in said channel of said first member, and a third member slidably mounted in said channel of said second member, said first member having a threaded stud mounted thereon adjacent its inner end, a nut threaded on said stud, said nut having upper and lower horizontal flanges and a vertical post intermediate said flanges, said third member having a slot formed in its inner end, said post of said nut engaging the walls of said slot and said upper and lower flanges engaging the horizontal surfaces of said third member adjacent said slot when said members are closed, a pair of spring biased latches mounted in a recess in the undersurface of said third member, a slot formed in said second member adjacent the end thereof, said latches being urged out of said recess to cooperate with said slot and said end to lock said third member against movement in either direction relative to said second member when said third member is withdrawn a predetermined distance, and means mounted on said second member for cooperating with an opening in said first member for preventing relative movement of said first and second members when said second member is withdrawn a predetermined distance, said means being engageable by said third member to release said first and second members.

References Cited by the Examiner
UNITED STATES PATENTS

| 2,289,092 | 7/1942 | Bernhard | 16—82 X |
| 3,039,153 | 6/1962 | Dusing | 20—19 X |
| 3,074,766 | 1/1963 | Meyer | 308—3.8 |

DAVID J. WILLIAMOWSKY, *Primary Examiner.*

DON A. WAITE, *Examiner.*

L. L. JOHNSON, *Assistant Examiner.*